United States Patent Office 3,519,725
Patented July 7, 1970

3,519,725
METHOD AND APPARATUS FOR USING DIELECTRIC INSULATING COMPOSITIONS CONTAINING PENTAFLUOROTHIO-SUBSTITUTED POLYFLUOROOXETANES
Gary Lee Gard, Beaverton, Oreg., Cyril Woolf, Morristown, N.J., and Ruth Martha Shaw, Cambridge, Mass., assignors to Allied Chemical Corporation, New York, N.Y., a corporation of New York
No Drawing. Filed Aug. 7, 1967, Ser. No. 658,621
Int. Cl. H05k 5/00
U.S. Cl. 174—17                           11 Claims

ABSTRACT OF THE DISCLOSURE

This specification discloses the addition of a minor amount of pentafluorothio-substituted polyfluorooxetanes to known gaseous dielectrics to improve the dielectric or electrical breakdown strength of these dielectrics. These gaseous mixtures are adaptable to be used in any method or apparatus suitable to the use of gaseous dielectrics.

---

Electrical apparatus insulated with gaseous dielectrics have been employed where oil-insulated apparatus is not suitable. However, these gases have dielectric strengths inferior to those of good liquid dielectrics, and the maximum voltage to which the apparatus may be subjected is lower for gas-filled than for oil-filled units.

It is desirable to have a gaseous dielectric medium with dielectric properties superior to known gaseous dielectrics, particularly having improved electrical breakdown strength in nonuniform fields.

It is a principal object of the present invention to provide a gaseous insulating medium which has high dielectric or electrical breakdown strength.

A further object is to provide an insulating medium which can be employed as an additive to gaseous dielectrics to provide a mixture having a higher dielectric or electrical breakdown strength than the gaseous dielectric to which it was added.

It is another object to provide an enclosed electrical apparatus embodying a gaseous insulating medium having high dielectric or electrical breakdown strength.

It is another object to provide a method for insulating spaced electrical elements normally subject to differences of electrical potential which have improved resistance to electrical breakdown.

Other objects and advantages will become apparent from the following detailed description thereof.

We have found that when a minor amount of one or more pentafluorothio-substituted polyfluorooxetanes selected from those having the formula

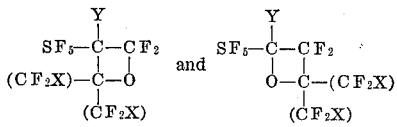

wherein Y can be fluorine, chlorine or hydrogen and X can be fluorine or chlorine, is added to a gaseous dielectric, an improvement in dielectric or electrical breakdown strength is obtained over that of the gaseous dielectric alone. For example, the electrical breakdown strength of both nitrogen and sulfur hexafluoride, both commonly used dielectric gases, improved when the above-described pentafluorothio-substituted polyfluorooxetanes were added.

The above-described pentafluorothio-substituted polyfluorooxetanes have been disclosed in a copending application Ser. No. 658,653, now Pat. No. 3,448,121, of Woolf and Gard, "Novel Fluorinated Oxetanes" filed concurrently with the present application. The pentafluorothio-substituted polyfluorooxetanes useful in the present invention can be prepared by reacting a perhalogenated acetone having the formula

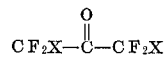

wherein X is as described above, with a pentafluorothio-substituted olefin having the formula $$SF_5CY=CF_2$$

wherein Y is as described above, in the presence of actinic radiation, particularly that radiation having high ultraviolet intensity. The preparation of an isomeric mixture of 2,2-bis-(trifluoromethyl)-3-pentafluorothiotrifluorooxetane and 2,2-bis-(trifluoromethyl)-4-pentafluorothiotrifluorooxetane is given below in detail to further illustrate the preparation of the above-described pentafluorothio-substituted polyfluorooxetanes.

A cylindrical reaction vessel was equipped with a water cooled double wall immersion well and a solid carbon dioxide cooled condenser. A high pressure, quartz mercury lamp was placed into the well as a source of high intensity ultraviolet light. The condenser was fitted with an outlet and line connecting the bottom of the condenser to the reaction vessel for the return of the condensate to the reaction vessel. The Dry Ice cooled vessel was first charged with a reaction mixture composed of 700 parts by weight of hexafluoroacetone and 272 parts by weight of 2-pentafluorothiotrifluoroethylene at atmospheric pressure. The reaction mixture was refluxed while exposed to the lamp for 12.5 hours when an additional 280 parts of hexafluoroacetone were added. The reaction was continued for 6.5 hours longer. The unreacted starting materials were distilled off and the reaction product was fractionally distilled.

The product boiling at 84–85° C. was collected. It was confirmed as containing 90 percent of 2,2-bis(trifluoromethyl) - 3 - pentafluorothiotrifluorooxetane and 10 percent of 2,2-bis(trifluoromethyl) - 4 - pentafluorothiotrifluorooxetane by infrared, vapor phase chromatographic and nuclear magnetic resonance analyses.

The elemental analysis was as follows: Theoretical for $C_5F_{14}OS$ (percent): C, 16.0; F, 71.0; S, 8.6. Found (percent): C, 14.7; F, 69.0; S, 8.8.

The pentafluorothio-substituted polyfluorooxetanes described hereinabove can be added to any known gaseous dielectric, including nitrogen and sulfur hexafluoride, either alone or in admixture with other known gaseous dielectrics such as perhalogenated, particularly perfluorinated hydrocarbons, trifluoromethyl sulfur pentafluoride, hexafluorobutyne and the like.

At least about 0.5% by volume of the pentafluorothio-substituted polyfluorooxetane should be added to the gaseous dielectric employed in order to obtain an improvement in electrical breakdown strength. The maximum amount of pentafluorothio-substituted polyfluorooxetane that can be employed is that amount which will saturate the gaseous dielectric, and is dependent upon the temperature and pressure of the gaseous mixture as well as the solubility of the pentafluorothio-substituted polyfluorooxetane in the particular dielectric gas or gaseous mixture employed.

In general, the addition of increased amounts of pentafluorothio-substituted polyfluorooxetane will increase the electrical breakdown strength of the gaseous mixture. However, even very small amounts, in the order of about 0.5% by volume, will increase that strength to an unexpectedly high degree.

Tests referred to herein were carried out in a "ball to plane cell" comprising a vertically disposed 2" internal diameter Pyrex tube 6" high. The lower end of the tube was secured in a gas-tight relation to a metallic base which included a ground terminal and a valve-controlled gas inlet opening into the bottom of the tube, to facilitate charging of gaseous dielectric. Projecting upward from the base and into the tube was a fixed electrode, electrically associated with the ground terminal, coaxially disposed with the tube, and capped by a horizontally disposed brass disc 1.5" in diameter fitted onto the top of the tube in gas-tight relation with a circular metallic cap including a high voltage terminal. Projecting downward from the center of the cap was a vertically moveable electrode coaxially disposed with the tube and carrying on the lower end thereof a ¾" steel sphere. The upper electrode, electrically connected with the high voltage terminal, was provided with a micrometer and means to raise and lower the electrode to determine and fix the gap between the sphere and face of the disc (ball and plane, respectively), the combination of which afforded a substantially uniform field. The electrode terminals were connected to a 60 cycle A.C. supply and other known accessories to allow control of voltage and voltage rate rise across the gap as well as observation of subject values. The power supply was limited to 20 kv. It is understood that the cell described has been proposed by the ASTM as standard equipment for use in determining the dielectric strength of a gas.

In the first series of tests, pure, dry sulfur hexafluoride was introduced into the cell to fill the same at substantially one atmosphere pressure, and room temperature. The gap between the sphere and the disk was fixed at 0.10". In runs 3 and 4 small amounts of a mixture of 90% of 2,2-bis(trifluoromethyl)-3-pentafluorothiotrifluorooxetane and 10% of 2,2-bis(trifluoromethyl)-4-pentafluorothiotrifluorooxetane prepared as described herein above were added to the sulfur hexafluoride, as given in Table I below. The tests were carried out at intervals of 5 to 7 minutes in order to allow the system to return to equilibrium between breakdowns.

TABLE I

| Run No. | Percent by volume | | Breakdown voltage | | | | |
|---|---|---|---|---|---|---|---|
| | SF$_6$ | Oxetanes | 1 | 2 | 3 | 4 | 5 |
| 1 | 100 | 0 | 16.1 | 15.7 | 16.0 | 16.0 | 15.6 |
| 2 | 100 | 0 | 16.5 | 15.9 | 16.3 | 16.3 | 16.1 |
| 3 [1] | 92 | 8 | 18.0 | 19.5 | >20 | >20 | >20 |
| 4 [1] | 92.7 | 7.3 | 19.1 | 19.4 | >20 | >19.1 | >20 |
| 5 | 100 | 0 | 14.0 | 15.3 | 16.2 | 16.7 | 16.2 |

[1] Some condensation of oxetanes occurred when the SF$_6$ was added.

In a second series of tests, a mixture containing 90% of 2,2-bis(trifluoromethyl)-3-pentafluorothiotrifluorooxetane and 10% of 2,2-bis(trifluoromethyl)-4-pentafluorothiotrifluorooxetane was added to nitrogen and testing conducted in a similar manner as that given above for sulfur hexafluoride. The results are given in Table II below.

TABLE II

| Run No. | Percent by volume | | Breakdown voltage | | | | | | | | | |
|---|---|---|---|---|---|---|---|---|---|---|---|---|
| | N$_2$ | Oxetane | 1 | 2 | 3 | 4 | 5 | 6 | 7 | 8 | 9 | 10 |
| 1 | 100 | 0 | 7.7 | 7.9 | 8.2 | 8.3 | 8.6 | 7.9 | 8.4 | 8.0 | 7.7 | 8.2 |
| 2 [1] | 97.1 | 2.9 | 11.3 | 10.8 | 11.4 | 11.4 | 11.3 | 11.4 | | | | |
| 3 | 100 | 0 | 7.8 | 7.4 | 7.3 | 7.5 | 8.0 | | | | | |
| 4 | 98.7 | 1.3 | 9.8 | 10.6 | 10.3 | 10.0 | 10.1 | | | | | |
| 5 | 99.47 | 0.53 | 9.2 | 9.1 | 9.4 | 9.7 | 10.2 | 8.6 | 9.2 | | | |

[1] A very small amount of condensation was noted.

Practice of the invention involves insulating any two or more spaced electric elements subject to differences of electrical potential by filling the space between such elements with gaseous dielectric. In practice the dielectric medium can contain any of the above-described mixtures comprising at least 0.5% by volume of the pentafluorothio-substituted polyfluorooxetanes described herein.

Method aspects of the invention are illustrated by the above-described operation of the testing cell which includes two spaced elements subject to differences of electrical potential and the filling of the space between these elements with gaseous mixtures containing various amounts of the subject pentafluorothio-substituted polyfluorooxetanes, as described.

The testing cell also exemplifies an apparatus of the invention that is a gas-tight casing, spaced apart electrical elements therein adopted to be subjected to differences of electrical potential, and gaseous mixtures containing the subject pentafluorothio-substituted polyfluorooxetanes, disposed within the casing.

It is not intended that practice of the invention be limited to a method or apparatus by the particular method and apparatus as above-described. The principles of the invention, from the standpoint of method, apply wherever a gaseous dielectric can be used and apparatus of the invention comprises other electrical equipment, such as generators, motors, transformers, circuit interrupters, coaxial cables and X-ray tube housings, to the extent that such equipment includes a gas-tight casing, spaced electrical elements therein adopted to be subjected to differences of electrical potential, and a gaseous insulator comprising a dielectric gas containing the subject pentafluorothio-substituted polyfluorooxetanes as hereinabove described.

We claim:

1. The method of insulating spaced electrical elements subject to differences of electrical potential comprising filling the space between said elements with a gaseous dielectric containing at least 0.5% by volume of one or more pentafluorothio-substituted polyfluorooxetones having the formula

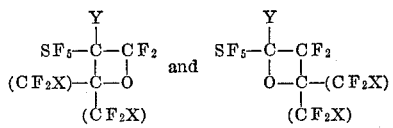

wherein Y is selected from the group consisting of hydrogen, fluorine and chlorine and X at each occurrence is a halogen independently selected from the group consisting of fluorine and chlorine.

2. The method according to claim 1 wherein said gaseous dielectric is nitrogen.

3. The method according to claim 2 wherein said pentafluorothio-substituted polyfluorooxetane consists essentially of a mixture of 2,2-bis(trifluoromethyl)-3-pentafluorothiotrifluorooxetane and 2,2-bis(trifluoromethyl)-4-pentafluorothiotrifluorooxetane.

4. The method according to claim 1 wherein said gaseous dielectric is sulfur hexafluoride.

5. The method according to claim 4 wherein said pentafluorothio-substituted polyfluorooxetane consists essentially of a mixture of 2,2-bis(trifluoromethyl)-3-pentafluorothiotrifluorooxetane and 2,2-bis(trifluoromethyl)-4-pentafluorothiotriflurooxetane.

6. The method according to claim 1 wherein said pentafluoroothio-substituted polyfluorooxetane consists essentially of a mixture of 2,2-bis(trifluoromethyl)-3-pentafluorothiotrifluorooxetane and 2,2-bis(trifluoromethyl)-4-pentafluorothiotrifluorooxetane.

7. Apparatus comprising a gas-tight casing, spaced electrical elements therein adapted to be subjected to differences of electrical potential, and a gaseous insulator between said elements comprising a gaseous dielectric containing at least 0.5% by volume of one or more pentafluorothio-substituted polyfluorooxetanes having the formula

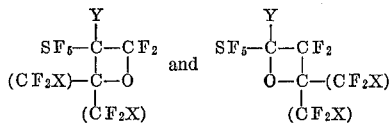

wherein Y is selected from the group consisting of hydrogen, fluoroine and chlorine and X at each occurrence is a halogen independently selected from the group consisting of fluorine and chlorine.

8. The apparatus according to claim 7 wherein said gaseous dielectric is nitrogen.

9. The apparatus according to claim 8 wherein said pentafluorothio-substituted polyfluorooxetane consists essentially of a mixture of 2,2-bis(trifluoromethyl)-3-pentafluorothiotrifluorooxetane and 2,2 - trifluoromethyl) - 4-pentafluorothiotrifluorooxetane.

10. The apparatus according to claim 7 wherein said gaseous dielectric is sulfur hexafluoride.

11. The apparatus according to claim 10 wherein said pentafluorothio-substituted polyfluorooxetane consists essentially of a mixture of 2,2-bis(trifluoromethyl)-3-pentafluorothiotrifluorooxetane and 2,2-bis(trifluoromethyl)-4-pentafluorothiotrifluorooxetane.

References Cited

UNITED STATES PATENTS

| 3,448,121 | 6/1969 | Woolf et al. | 260—333 |
| 3,362,963 | 1/1968 | Woolf et al. | 260—333 |
| 2,995,571 | 8/1961 | Harris | 260—333 |

PHILIP DIER, Primary Examiner

M. E. McCAMISH, Assistant Examiner

U.S. Cl. X.R.

252—65, 66

PO-1050
(5/69)

UNITED STATES PATENT OFFICE
CERTIFICATE OF CORRECTION

Patent No. 3,519,725          Dated July 7, 1970

Inventor(s) Gary Lee Gard, Cyril Woolf, and Ruth Martha Shaw

It is certified that error appears in the above-identified patent and that said Letters Patent are hereby corrected as shown below:

Column 4, line 31, "polyfluorooxetones" should be --polyfluorooxetanes--.

Column 5, line 11, "fluoroine" should be --fluorine--.

Column 5, line 19, "2,2 - trifluoromethyl)" should be --2,2-bis(trifluoromethyl)--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents